(12) United States Patent
Miceli et al.

(10) Patent No.: US 9,842,286 B1
(45) Date of Patent: Dec. 12, 2017

(54) OVERFLOW PANEL SYSTEM FOR PHARMACEUTICAL CONTAINER

(71) Applicant: Tri State Distribution, Inc., Sparta, TN (US)

(72) Inventors: David A. Miceli, Reno, NV (US); Joseph A. Miceli, Spencer, TN (US)

(73) Assignee: Tri State Distribution, Inc., Sparta, TN (US)

( * ) Notice: Subject to any disclaimer, the term of this patent is extended or adjusted under 35 U.S.C. 154(b) by 0 days.

(21) Appl. No.: 15/430,935

(22) Filed: Feb. 13, 2017

Related U.S. Application Data

(63) Continuation-in-part of application No. 15/019,356, filed on Feb. 9, 2016, which is a continuation-in-part of application No. 14/803,781, filed on Jul. 20, 2015, now Pat. No. 9,586,712, which is a continuation of application No. 13/478,414, filed on May 23, 2012, now Pat. No. 9,114,660, which is a continuation-in-part of application No. 13/347,288, filed on Jan. 10, 2012, now abandoned, application No. 15/430,935, which is a continuation-in-part of application No. 13/804,930, filed on Mar. 14, 2013, which is a continuation-in-part of application No. 13/478,414, filed on May 23, 2012, now Pat. No. 9,114,660, which is a continuation-in-part of application No. 13/347,288, filed on Jan. 10, 2012, now abandoned.

(60) Provisional application No. 61/508,347, filed on Jul. 15, 2011.

(51) Int. Cl.
*G06K 15/16* (2006.01)
*G06K 15/02* (2006.01)

(52) U.S. Cl.
CPC .......... *G06K 15/024* (2013.01); *G06K 15/16* (2013.01); *G06K 15/1802* (2013.01); *G06K 15/1823* (2013.01); *G06K 15/1868* (2013.01); *G06K 15/1889* (2013.01); *G06K 2215/0037* (2013.01); *G06K 2215/0097* (2013.01)

(58) Field of Classification Search
CPC .......... B65C 9/0015; B65C 9/40; B65C 3/08; B65C 2009/0018; B65C 2009/404; B41F 19/001; B65D 51/24; B42D 15/00; G09F 3/0288

See application file for complete search history.

(56) References Cited

U.S. PATENT DOCUMENTS

2008/0097787 A1 * 4/2008 Palazzolo .......... B42D 15/0053
705/2

* cited by examiner

*Primary Examiner* — Jacob T Minskey
*Assistant Examiner* — Vishal I Patel
(74) *Attorney, Agent, or Firm* — Luedeka Neely Group, PC

(57) ABSTRACT

Methods for producing a label for a prescription container having non-prescription specific information pre-printed off-site from the pharmacy by a label supplier. The methods optimize prescription container size by providing the pharmacy with the ability to efficiently print and apply a label to the prescription container with the pre-printed non-prescription specific information for most prescriptions with shorter prescription specific information or to print and apply a label without the non-prescription specific information for prescriptions with longer prescription specific information.

12 Claims, 13 Drawing Sheets

OVERFLOW PANEL SYSTEM FOR PHARMACEUTICAL CONTAINER

CROSS-REFERENCE TO RELATED APPLICATIONS

This application is a continuation-in-part of co-pending U.S. application Ser. No. 15/019,356 filed Feb. 9, 2016, which claimed priority as a continuation-in-part of Ser. No. 14/803,781 filed Jul. 20, 2015, which claimed priority as a continuation of U.S. application Ser. No. 13/478,414 filed May 23, 2012, and granted as U.S. Pat. No. 9,114,660, which claimed priority as a continuation-in-part to co-pending U.S. application Ser. No. 13/347,288 filed Jan. 10, 2012, which claimed priority to U.S. Provisional Application Ser. No. 61/508,347 filed Jul. 15, 2011, all of which being entitled "Overflow Panel System for Pharmaceutical Container" and incorporated by reference herein in their entireties.

This application is also a continuation-in-part of co-pending U.S. application Ser. No. 13/804,930 filed Mar. 14, 2013, entitled "Method for Labeling Pharmaceutical Container With Color Advertising," which claimed priority as a continuation-in-part of U.S. application Ser. No. 13/478,414 filed May 23, 2012, entitled "Overflow Panel System for Pharmaceutical Container" and granted as U.S. Pat. No. 9,114,660, which claimed priority as a continuation-in-part to co-pending U.S. application Ser. No. 13/347,288 filed Jan. 10, 2012, entitled "Overflow Panel System for Pharmaceutical Container" which claimed priority to U.S. Provisional Application Ser. No. 61/508,347 filed Jul. 15, 2011, entitled "Overflow Panel System for Pharmaceutical Container," all of which being incorporated by reference herein in their entireties.

FIELD

This disclosure relates generally to a label system that may be applied to a vial, bottle, or other container. More particularly, this disclosure relates to a labeling system for prescription containers, the labeling system having a first label for printing prescription information and an overflow label for printing a continuation of the prescription information if the prescription information is too large to fit on the first label.

BACKGROUND

The present disclosure relates generally to a prescription pharmaceutical container labeling system.

Currently, labels applied to prescription containers include what is commonly referred to as SIG information. SIG is short for Signa (Latin) which means "written," and this terminology is a remnant from the past when all prescriptions were handwritten and signed by the physician. Accordingly, SIG information refers to the information on the written prescription signed by the physician, which is (1) the name of the patient, (2) identification of the medicine, e.g., the name and strength of the medicine, and (3) instructions to the patient for taking the medicine.

It has become common for Purpose information to be added to the prescription label. Purpose information is information that relates to why the medicine is taken—e.g., to reduce inflammation, for nausea, for pain, and the like.

It is desired in some circumstances to use 12-point or larger font for all SIG and Purpose information on prescription labels. In many cases, the SIG and Purpose information in 12-point font does not present a space issue. However, for some prescriptions, which have lengthy instruction information, such as in the case of prednisone, the SIG and Purpose information is difficult to fit on certain containers especially in larger font sizes and/or when auxiliary information is needed. Auxiliary information is not currently required, but is often desired. For the purpose of example, auxiliary information often provided involves information such as food interaction cautions, such as "Do Not Take With Dairy" in the case of tetracycline prescriptions, since tetracycline is made less effective when consumed with dairy. Auxiliary information labels are conventionally narrow, pre-printed stickers provided in dispensers in the manner of tape and applied to a free space on the label by the pharmacist dispensing the prescription.

Pharmaceutical containers are generally provided with a standard label space depending on the size of the container. Conventional smaller containers, such as 13 dram and 16 dram containers, have a label space of usually about 4 inches in circumference and a height that increases from about 2 inches to about 3 inches based on the size of the container. Typical larger containers, 30 drams and up, usually have a label space having a height range similar to the smaller containers but the circumference is increased to about 6 inches.

As it stands, the only way pharmacies can currently provide SIG and Purpose information in 12-point font together with desired auxiliary warning information for all possible prescriptions using conventional labels and containers is to use excessively large containers typically having large wrap around labels. That is, the prescription may fit into a small container, such as a 13 dram vial, but the label information as currently provided requires label space that requires a much larger container, such as a 30 dram vial. Thus, the prescription is provided in the larger 30 dram vial. Further, the more information desired on the label by the pharmacy results in larger labels and larger containers. Accordingly, one major problem with conventional prescription labels is that they will require pharmacies to use larger and more expensive vials and containers for every prescription they dispense, even though the larger containers would not be necessary for most prescriptions.

As seen in FIGS. 1A-1B, prior art prescription containers, such as containers 4 and 6, are typically cylindrical and the labeling for the cylindrical containers 4, 6 is oriented such that the lines of alphanumeric characters are disposed on labels 2A substantially perpendicular to the axis of the container. Prior art labels 2A have traditionally been printed in a single size and single geometric design in order to simplify inventory and procedures at the pharmacies. In an attempt to reduce costs, the label sizes are typically designed for the smallest sized cylindrical containers.

There are many disadvantages to using a single label sized to fit all sizes of containers. For example, a label sized to fit a small container requires the information displayed on the label to be printed in a small font (less than 12 point) in an attempt to fit all the information on to the label. Even if all the information is able to be printed on a single label, a patient must still rotate the container in order to read the information. As shown in FIG. 1A, the small diameter of container 4 and the words and phrases of label 2A having more than a few letters results in the holder of the container to rotate the container about its axis in order to be able to read the information contained thereon. This is especially cumbersome given the multiple characters and letters required for most pharmaceutical names and prescription instructions. Additionally, because these smaller sized labels and fonts are generally used on the larger containers, the information contained on the larger container 6 is still difficult to read.

Additionally, as more and more information is desired to be provided on a prescription label, pharmacies have used excessively large containers having larger wrap around labels to display the information in a readable size. Even if large wrap around labels are used, any information and warnings on the labels in the form of sentences or small paragraphs require multiple turns and rotations of the container in order for a user to be able to read that information. Further, there still may not be enough space left on the container for a pharmacist to include labels having auxiliary information. Instead, the critical auxiliary information is usually provided on an additional handout sheet that is often thrown away or lost by the patient.

Another disadvantage in using a single label is that the length of the information provided to the patient varies by prescription. For example, the instructions for taking certain pharmaceuticals may be very brief (e.g., "take 2 times a day for 7 days") while others may be much longer (e.g., "take 5 times on day 1, 4 times on day 2, 3 times on day 3, 2 times on day 4, and 1 time on day 5"). As a result, unused space may be left on a larger container or a larger label for a prescription having brief instructions.

Accordingly, improvement is desired in the labeling of pharmaceutical containers and what is desired is a way to label such pharmaceutical containers that maximizes the space on the container while providing all desired information. Such will improve the readability of the information, medical or otherwise, positioned on the pharmaceutical container such that a reader of that information can readily read, ascertain, and comprehend the information. Additionally, it is desired to provide the labeling system so that a single label configuration may be used for a variety of sized containers

SUMMARY

A method of producing a prescription label for a prescription pharmaceutical storage container for holding and dispensing a pharmaceutical for a patient includes the steps of receiving at a pharmacy a label system having at least a first label and a second label, each of the first and second labels having a first distinct label section and a second distinct label section, the first distinct label section being configured to receive prescription specific information printed at the pharmacy and the second distinct label section including non-prescription specific information pre-printed off-site from the pharmacy by a label supplier; determining at the pharmacy whether a length of prescription specific information for the pharmaceutical being dispensed fits entirely on the first distinct label section of the first label; upon determining that the length of the prescription specific information fits entirely on the first distinct label section of the first label, printing the prescription specific information on the first distinct label section of the first label and applying the first distinct label section and second distinct label section of the first label to the prescription pharmaceutical storage container; and upon determining that the length of the prescription specific information does not fit entirely on the first distinct label section of the first label, printing a first portion of the prescription specific information on the first distinct label section of the first label, printing a continuation of the prescription specific information on the first distinct label section of the second label, and applying the first distinct label section of the first label and the first distinct label section of the second label to the prescription pharmaceutical storage container.

According to certain embodiments, the label system further includes a third label similarly configured to the first and second label and the method further includes, when the prescription specific information is printed entirely on the first distinct label section of the first label, producing a second prescription label for a second pharmaceutical by beginning printing of prescription specific information for the second pharmaceutical on the second label, and, when the continuation of the prescription specific information is printed on the first distinct label section of the second label, producing the second prescription label for the second pharmaceutical by beginning printing of prescription specific information for the second pharmaceutical on the first distinct label section of the third label.

According to certain embodiments, the first and second distinct label sections of the first label are removably connected and the first and second distinct label sections of the second label are removably connected, and the method further comprises, when the prescription specific information is printed entirely on the first distinct label section of the first label, applying the first distinct label section and second distinct label section of the first label to the prescription pharmaceutical storage container while connected; and prior to applying the first distinct label section of the first label and the first distinct label section of the second label to the prescription pharmaceutical storage container when the continuation of the prescription specific information is printed on the first distinct label section of the second label, separating the first distinct section of the first label from the second distinct section of the first label and separating the first distinct section of the second label from the second distinct section of the second label. In some embodiments, the first label is secured to a first distinct substrate and the second label is secured to a second distinct substrate, and the method further comprises loading the first distinct substrate and the second distinct substrate as successive pages in a printer. In other embodiments, the first label and second label are provided as successive labels on a label roll.

According to certain embodiments, the prescription specific information includes at least a name of the patient, identification of the pharmaceutical dispensed in the prescription pharmaceutical storage system, and dosing instructions to the patient for taking the dispensed pharmaceutical being printed in at least 12-point font. In some embodiments, the prescription specific information further includes warning information that may or may not be printed in at least 12-point font. According to some embodiments, the non-prescription specific information includes an advertisement.

According to certain embodiments, the method further includes the pharmacy selecting the non-prescription specific information to be pre-printed off-site from the pharmacy on the second distinct label section and the pharmacy providing the selection to the label supplier.

According to certain embodiments, the first distinct label section of the first and second labels each includes a first label panel removably connected to a second label panel and the second distinct label section of the first and second labels each include a third label panel removably connected to the second label panel, the continuation of the prescription specific information being printed on the first label panel of the first label section of the second label. In some embodiments, each of the first, second, and third label panels include a length of about 2 inches to about 2.125 inches.

According to certain embodiments, the steps of determining whether the length of prescription specific information fits entirely on the first distinct label section of the first label and printing the prescription specific information on the first distinct label section of the first label or the first distinct section of the first and second labels comprise automated steps performed by a computer controller.

According to another embodiment of the disclosure, a method of producing a prescription label for a prescription pharmaceutical storage container for holding and dispensing a pharmaceutical for a patient includes receiving at a pharmacy a label system, the label system including: a first label having a first distinct label section including a first label printable area configured to receive prescription specific information printed at the pharmacy and a second distinct label section including non-prescription specific information pre-printed off-site from the pharmacy by a label supplier, and a second label having a second label printable area configured to receive prescription specific information printed at the pharmacy, the second label printable area being larger than the first label printable area; loading the first label in a first printing source and loading the second label in a second printing source; determining at the pharmacy whether a length of prescription specific information for the pharmaceutical being dispensed fits entirely in the first label printable area of the first distinct label section of the first label; upon determining that the length of the prescription specific information fits entirely in the first label printable area, selecting the first printing source, printing the prescription specific information on the first distinct label section of the first label, and applying the first label to the prescription pharmaceutical storage container; and upon determining that the length of the prescription specific information does not fit entirely in the first label printable area, selecting the second printing source, printing the prescription specific information in the second label printable area of the second label, and applying the second label to the prescription pharmaceutical storage container.

According to certain embodiments, the first printing source is a first paper tray and the second printing source is a second paper tray both disposed in one printer. According to other embodiments, the first printing source is a first printer and the second printing source is a second printer.

According to certain embodiments, the steps of determining whether the length of prescription specific information fits entirely in the first label printable area of the first label, selecting either the first printing source or the second printing source, and printing the prescription specific information in the first label printable area of the first label or the second label printable area of the second label comprise automated steps performed by a computer controller.

According to certain embodiments, the prescription specific information includes at least a name of the patient, identification of the pharmaceutical dispensed in the prescription pharmaceutical storage system, and dosing instructions to the patient for taking the dispensed pharmaceutical being printed in at least 12-point font. In some embodiments, the prescription specific information further includes warning information that may or may not be printed in at least 12-point font. In some embodiments, the non-prescription specific information includes an advertisement.

According to certain embodiments, the method further includes the pharmacy selecting the non-prescription specific information to be pre-printed off-site from the pharmacy on the second distinct label section of the first label and the pharmacy providing the selection to the label supplier.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
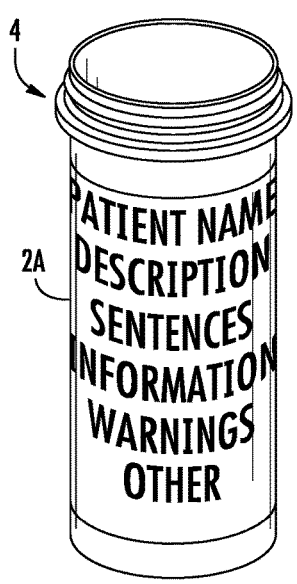
FIG. 1A depicts a perspective view of an example of a conventional label placed on a smaller sized cylindrical pharmaceutical container in a pharmaceutical storage system.
Figure 1B:
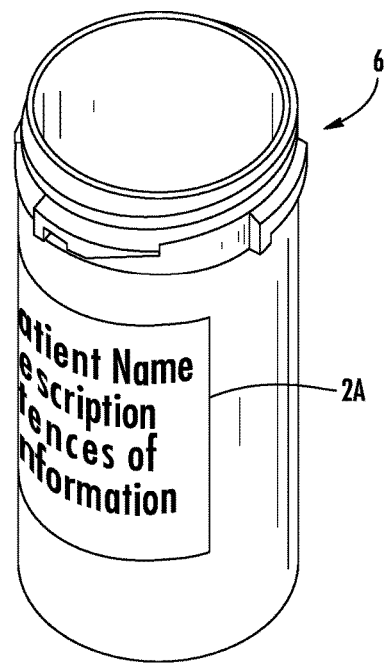
FIG. 1B depicts a perspective view of the conventional label shown in FIG. 1A placed on a larger sized cylindrical pharmaceutical container in a pharmaceutical storage system.

The disclosure relates to methods of producing a label for a prescription pharmaceutical storage container for holding and dispensing a pharmaceutical for a patient that enables a pharmacy to reduce the number of labels required for labeling containers having different sizes. This can result in a cost savings in labels, cost savings in vials, reduces the pharmacy workflow requirements, reduces inventory costs, and may enable enhanced productivity in the pharmacy.

Referring to FIGS. 2-3, two different prescription pharmaceutical storage systems according to the disclosure are shown, each including a pharmaceutical container 12 for holding and dispensing a pharmaceutical prescription for a patient and a rectangular label 14 sized and configured to wrap around the outer circumference of the pharmaceutical container 12. The container 12 is preferably cylindrical but can take various shapes such as triangular, quadrilateral, and the like. The container 12 includes a neck 16 and one or more engaging devices 18. The engaging devices 18 are operable to interact with an engaging mechanism on a closure/cap to secure the closure to the container 12. Suitable engaging devices 18 and engaging mechanisms include one or more beads, threads, lugs or the like as known in the art. The space between the neck 16 and a bottom 19 of the container 12 provides space to position the label 14.

Figure 2A:
FIG. 2A depicts a front view of a smaller sized container having a label including a first label panel and a second label panel applied thereto according to one embodiment of the disclosure.
Figure 2B:
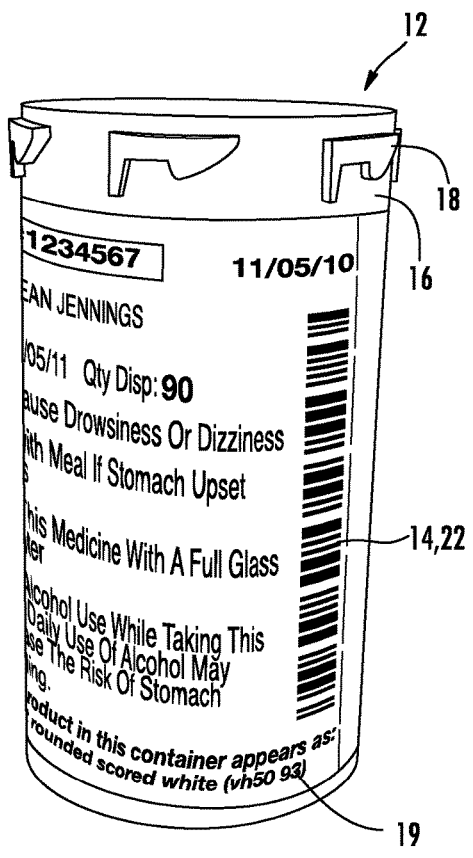
FIG. 2B depicts a rear view of the second label panel applied to the container of FIG. 2A according to one embodiment of the disclosure.

The container 12 shown in FIGS. 2A-2B is a small sized container, preferably a 13 or 16 dram container. While particular dimensions of various containers 12 can vary, the space to position the labels on a 13 dram container typically includes a height of between about 2 inches to about 2.5 inches and a circumference of about 4 inches to about 4.5 inches. A 16 dram container typically includes the same circumference but includes a larger height of about 2.5 inches to about 3 inches.

Figure 3A:
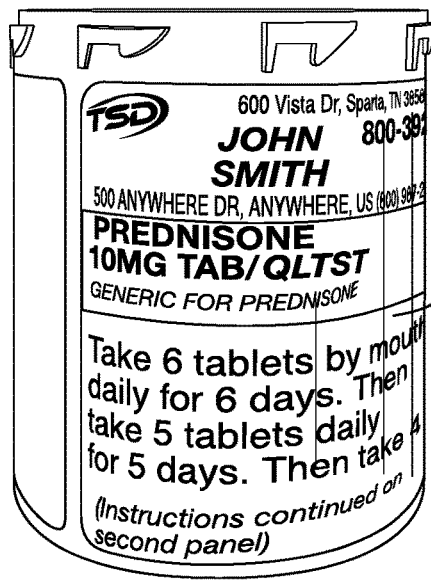
FIG. 3A depicts a front view of a larger sized container having a label including a first label panel, second label panel, and third label panel applied thereto according to one embodiment of the disclosure.
Figure 3B:
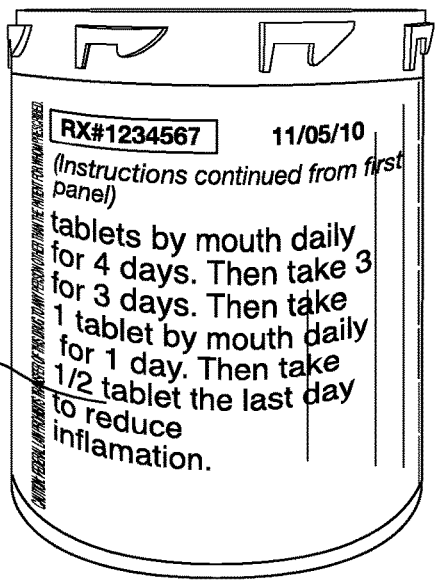
FIG. 3B depicts a side view of the second label panel applied to the container of FIG. 3A according to one embodiment of the disclosure.
Figure 3C:
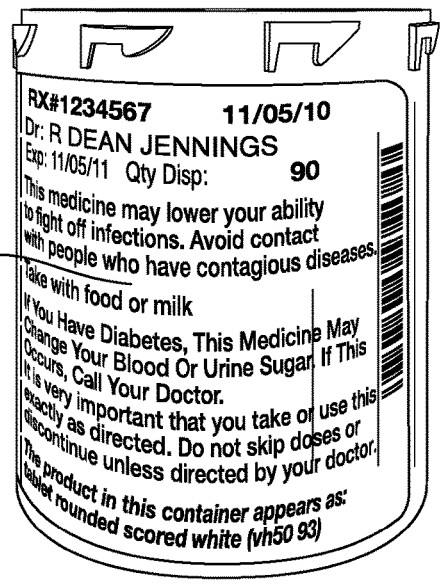
FIG. 3C depicts another side view of the third label panel applied to the container of FIGS. 3A and 3B according to one embodiment of the disclosure.

Referring to FIGS. 3A-3C, a larger sized container 12 is shown such as a 30 dram container. While the particular dimensions of larger containers typically vary more widely than the dimensions of smaller containers, larger containers usually include a circumference of about 6 inches or greater giving the ability to apply longer labels to the larger containers. Pharmacies typically stock a supply of both smaller and larger containers to be used based on the prescription needed to be filled. In other words, a pharmacist generally chooses an appropriate container based on the volume of the prescribed pharmaceutical needed to fit in the pharmaceutical container 12.

Figure 4:
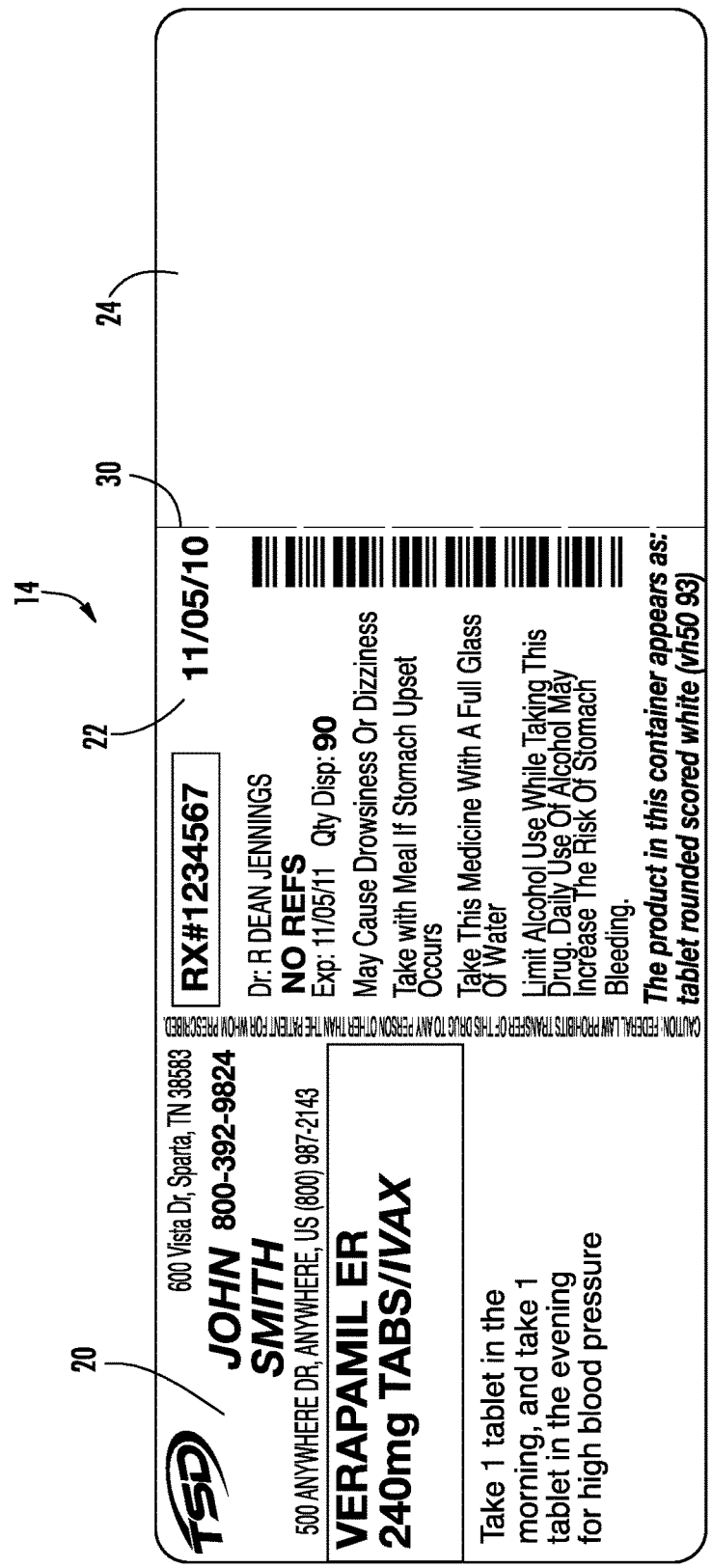
FIG. 4 depicts a printed label for an exemplary verapamil prescription according to one embodiment of the disclosure.
Figure 5:
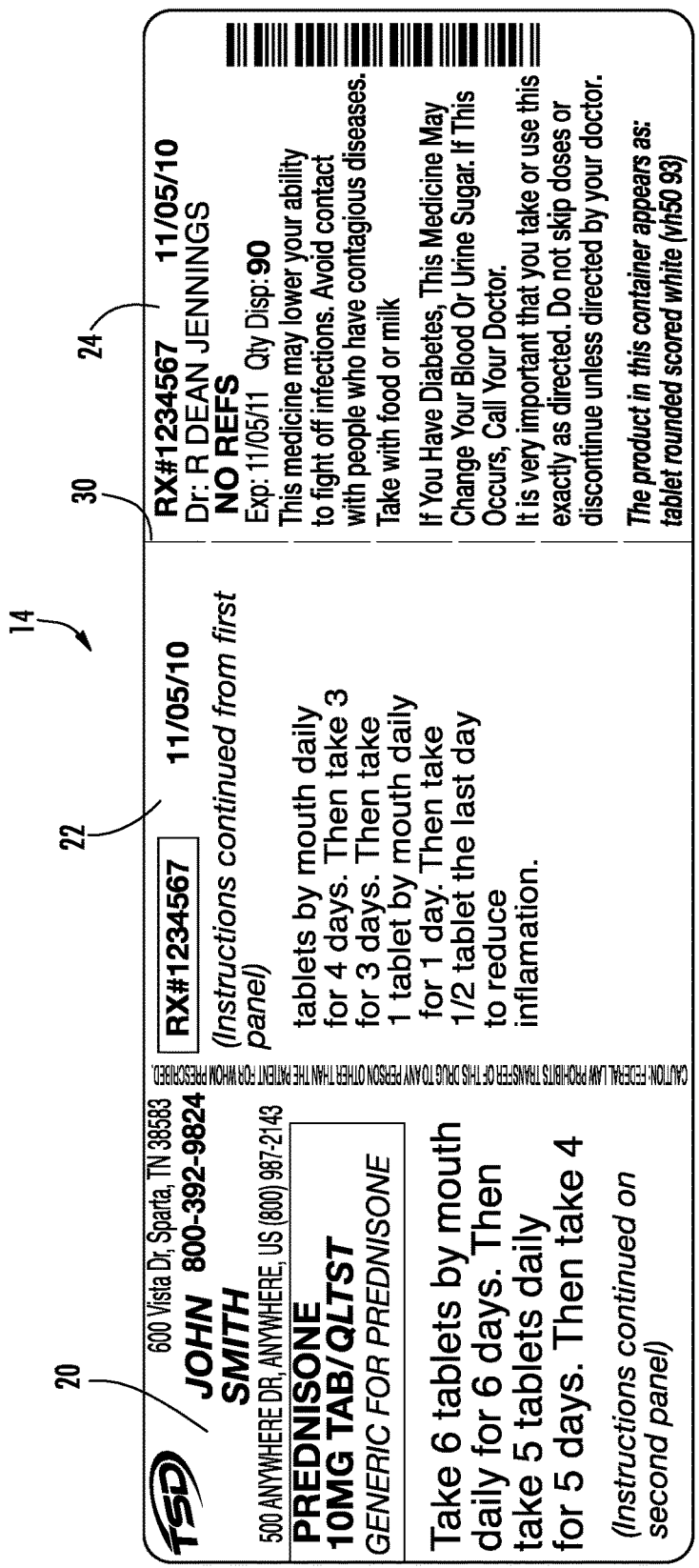
FIG. 5 depicts a printed label for an exemplary prednisone prescription according to one embodiment of the disclosure.

Referring to FIGS. 4 and 5, two rectangular labels 14 are shown as printed according to the disclosure for two exemplary prescriptions, one prescription for the pharmaceutical commonly known as verapamil and another prescription for the pharmaceutical commonly known as prednisone. The labels 14 may be provided on a label sheet to be printed by a laser printer or inkjet printer or on a label roll to be printed by a direct thermal printer, and the printers may be color or black and white printers.

Each rectangular label 14 shown in FIGS. 4 and 5 preferably includes a height ranging from about 2 inches to about 2.5 inches, and most preferably about 2.125 inches for labels designed to be applied to a 13 dram container and about 2.5 inches for labels designed to be applied to a 16 dram container. The length of each of the labels 14 preferably ranges from about 6 inches to about 6.875 inches. The rectangular label 14 preferably includes a first label panel 20, a second label panel 22, and a third label panel 24. Each of the three label panels 20, 22, and 24 is preferably of substantially the same dimensions and dimensioned and configured such that the information printed on each particular label panel is able to be read when applied to a container 12 without requiring significantly turning or rotating of the container 12. In preferred embodiments, each label panel is about 2 inches to 2.5 inches in height, and most preferably about 2.125 inches, and about 2 inches to 2.125 inches in length, and most preferably about 2 inches.

The first label panel 20 generally includes more critical patient directed prescription information printed on the label panel such as the SIG information, i.e., (1) the name of the patient, (2) identification of the medicine, e.g., the name and strength of the medicine, and (3) instructions to the patient for taking the medicine. The prescription information of the first label panel 20 also preferably includes the "Purpose" or intended use of the pharmaceutical which should be stated in clear and simple terms.

The prescription information printed on the first label panel 20 is usually required, at least in part, to be provided on the pharmaceutical container by various national and regional laws. While the prescription information may be printed on the first label in any particular size, the prescription information is preferably printed in 12-point font in order to improve the readability of the prescription information. While smaller font sizes may be readable by certain patients, other patients with vision impairments such as the elderly greatly benefit from larger font sizes. However, it is inconvenient and often times impracticable for a pharmacist to alter font sizes on prescription labels based on the needs of each particular patient. Accordingly, it is preferable that a uniform font style and size be chosen and used for each patient.

The information of the second label panel 22 and third label panel 24 will vary depending on the particular prescription being filled by the pharmacist. When the prescription information is able to be printed entirely on the first label panel 20, the second label panel 22 is used as an auxiliary label. The auxiliary label generally includes warning or auxiliary information such as "may cause drowsiness," "take with food," "do not take with alcohol," etc. The warning information of the auxiliary label should clarify the instructions of the prescription information and is important to the patient's appropriate use of the pharmaceutical. When the prescription information fits completely within the first label panel 20, the third label panel 24 is not needed. In these situations, all the necessary and preferred information is able to be depicted on the first and second label panels 20 and 22. Further, a label 14 containing only the first and second label panels 20, 22 is dimensioned to fit on the smallest commonly used prescription containers, 13 dram and 16 dram containers. As further described below, the third label panel 24 may be removed from labels 24 when prescriptions have shorter prescription information so that the label 14 containing just the first and second label panels 20 and 22 may be applied to smaller containers having circumferences as small as about 4 inches.

In situations where the prescription information does not fit entirely on the first label panel 20, the prescription information can be continued on the second label panel 22. The third label panel 24 is then used to print the auxiliary label for the prescription. In situations in which the prescription information overflows from the first label panel 20 to the second label panel 22, the label 14, including the third label panel 24 having the warning information, is applied to a larger bottle having a greater circumference such as the 30 dram container. Alternatively, even when the prescription information does fit entirely on the first label panel 20 but the volume of the pharmaceutical needed to fill the prescription is too great to fit in a smaller container or the pharmacist would like to use the third label panel 24 for another purpose such as an advertisement, the advertisement may be printed on the third label panel 24 and the label 14 containing the first, second, and third label panels 20, 22, and 24 is applied to a larger container.

In an alternate embodiment, the prescription information and auxiliary warning information may sometimes be combined when printed on label 14. For example, in situations in which a pharmaceutical prescription includes prescription information having few characters but a large amount of warning information needed to be printed on an auxiliary label, some of the warning information may be included in the first label panel 20 and the remaining warning information is then printed on the second label panel 22. Alternatively, where the prescription information is long and the warning information is short, the prescription information may overflow to the second label panel 22 and printed along with the warning information printed on the same panel. In certain situations, the warning information may also overflow to the third label panel 24 in situations when it is too long to fit entirely on the second label panel 22. For purposes of the present disclosure, the prescription information and/or auxiliary information may also be referred to herein as "prescription specific information" as the type of information to be printed for a particular label is dependent on the patient and/or the medication prescribed to the patient to which the label is assigned.

In preferred embodiments, one or more of the label panels are operable to be selectively removed from the single continuous label 14 by tearing or pealing the particular label panel from the label 14. To facilitate removal, the label 14 may include one or more perforated lines 30 disposed between the appropriate label panels. The perforated lines preferably include a plurality of tab portions which can be used to both hold the panels of the label 14 together and facilitate removal of a particular panel or panels from the label 14. In other words, the tabs are used to connect adjacent panels to facilitate removal of the label 14 from a substrate as a single continuous piece while also facilitating a user, such as a pharmacist, in separating a particular panel from the label 14 by breaking the tabs when a certain panel is desired to not be included with label 14 applied to a container 12. For reasons discussed below, each label 14 preferably includes, as shown in FIGS. 4-5, a perforated line 30 disposed between the second label panel 22 and third label panel 24 but no perforated line between the first label panel 20 and second label panel 22. Thus, the label 14 preferably includes a first section containing the first label panel 20 and the second label panel 22. The second section includes the third label panel 24. When applying the label 14 to a smaller container, the tabs of the perforated line 30 between the second label panel 22 and third label panel 24 are broken so that label 14 having only the first section is removed from the substrate. When applying the label 14 to a larger container and/or when it is desired to include the third label panel 24 as part of label 14, the tabs facilitate removal of the label 14 including both the first label section and the second label section.

It is estimated that the entirety of the prescription information for most pharmaceuticals and prescriptions will fit onto the first label panel 20, and, thus, the second label panel 24 will usually be used as an auxiliary label. It will also be understood that a 13 dram cylindrical container 12 such as that shown in FIGS. 2A-2B is able to accommodate, without any overwrapping of the label 14, a rectangular label having a total length of about 4 inches and a height of about 2.125 inches. Thus, assuming the pharmaceutical will fit within a 13 dram container, the present disclosure provides a label system that has at least two distinct label panels to enable all critical prescription information as well as any necessary and desired warning information to be supplied on a label sized to fit a container as small as a 13 dram container for most prescriptions. Such critical information includes, as described above, the SIG and Purpose information of the prescription. This is highly significant because a pharmacy using the described label system can fill the majority of prescriptions using the smaller 13 and 16 dram sized containers. As will be appreciated, the cost savings represented by enabling the majority of prescriptions to be provided in the smaller 13 and 16 dram containers as opposed to larger containers, is significant and enables considerable cost savings to pharmacies.

It is noted that the third label panel 24 and overflow concept described above is particularly useful in situations where the label 14 of a particular pharmaceutical prescription is printed in a language other than English as the same information printed in other languages frequently requires more characters than its English counterpart. Thus, in locations where customers request the pharmacist to print the pharmaceutical prescription label in another language such as Spanish, the third label panel will likely be more frequently used.

Referring to the exemplary verapamil prescription printed on the label 14 shown in FIG. 4, the first label panel 20 includes the prescription information which identifies the patient's name, the name and dosage of the pharmaceutical, the instructions to the patient for taking the pharmaceutical, and the purpose of the pharmaceutical. As the entirety of the prescription information for this particular verapamil prescription is able to fit on the first label panel 20 in a readable font, preferably 12 point font, the second label panel 22 is used as an auxiliary label and includes various warnings associated with the pharmaceutical, the prescribing doctor, date of filling the prescription, expiration date, and quantity. Accordingly, the third label panel 24 is not needed and may be removed so that the continuous label 14 containing the first label panel 20 and second label panel 22 may be applied to a 13 dram container as shown in FIGS. 2A-2B.

Referring to the exemplary prednisone prescription printed on the label 14 of FIG. 5, the first label panel 20 similarly identifies the patient's name, the name and dosage of the pharmaceutical, and a portion of the instructions to the patient for taking the pharmaceutical. However, as this particular prescription requires the amount of the pharmaceutical taken to be tapered off over the course of the prescribed period, the length of the prescription information, and, in particular the instructions to the patient for taking the pharmaceutical, is too long to fit entirely on the first label panel 20. Accordingly, the remaining prescription information is printed on the second label panel 22 and the auxiliary warning information is printed on the third label panel 24. As the warning information is preferably provided on each of the containers 12 as opposed to printing the warning information on handouts or other loose sheets that typically do not stay with the container during the consumption of the full dosage of the prescription, the continuous labels 14 containing all three panels is applied to a larger container such as the 30 dram container depicted in FIGS. 3A-3B.

Figure 6:
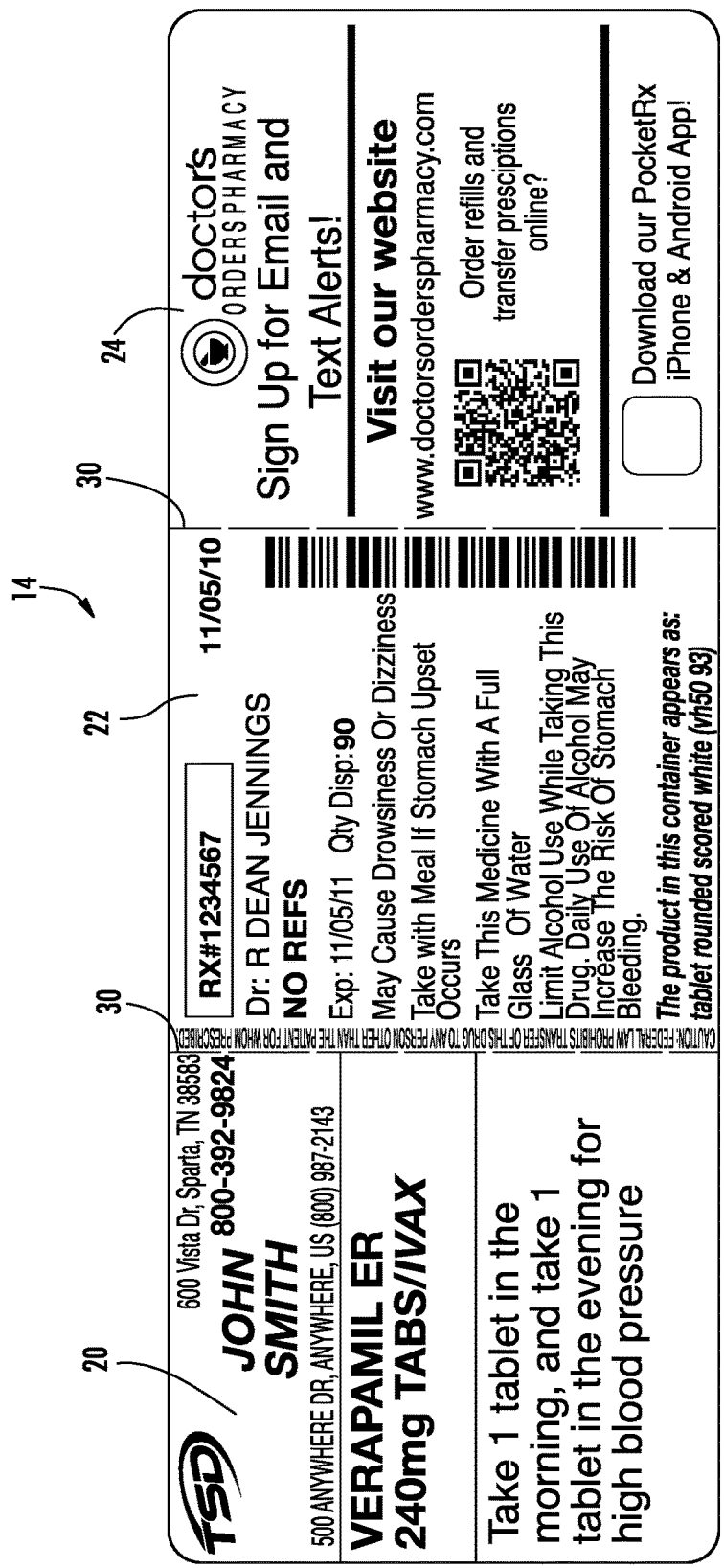
FIG. 6 depicts a printed label for an exemplary verapamil prescription where the third label panel is used to print an advertisement according to one embodiment of the disclosure.
Figure 7:
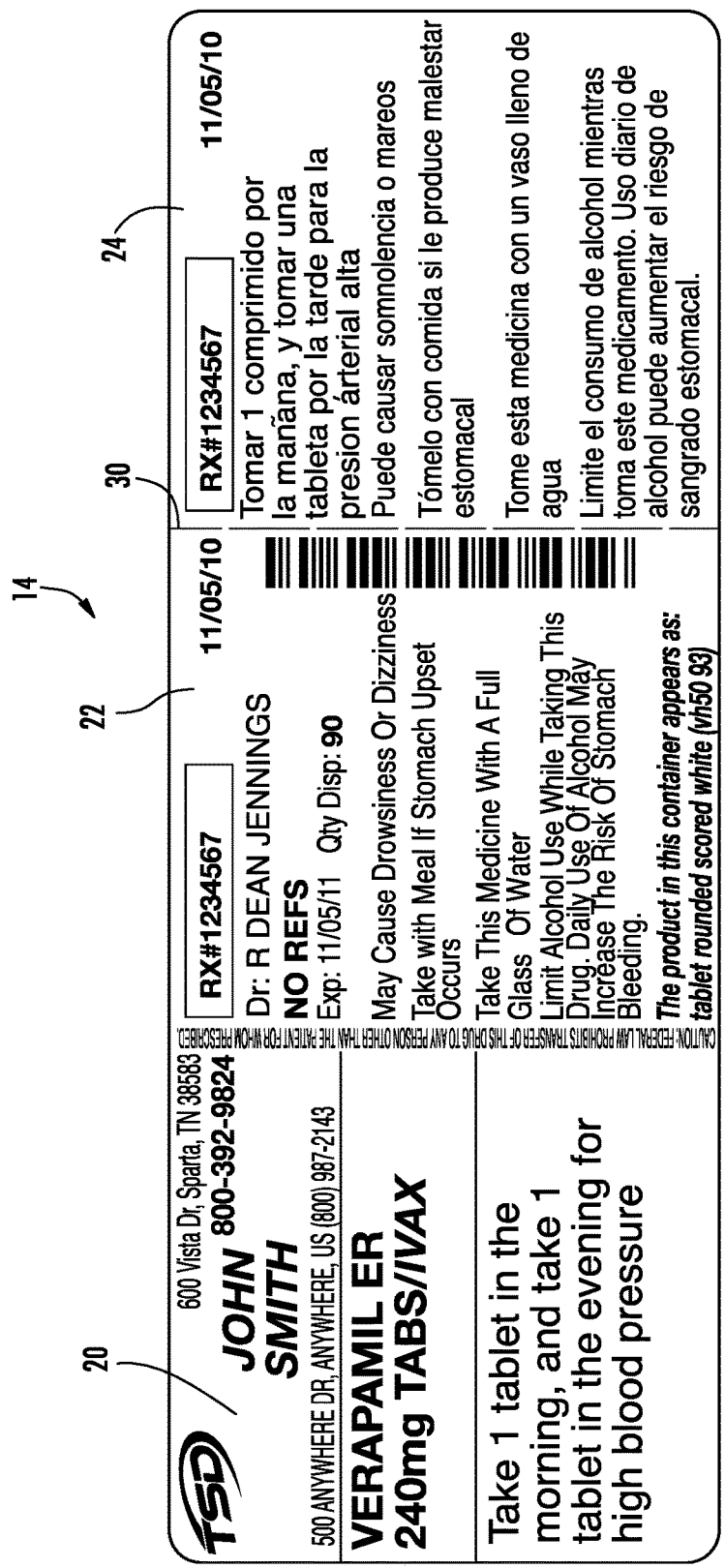
FIG. 7 depicts a printed label for an exemplary verapamil prescription where the third label panel is used to print prescription and warning information in a language different than the language of the information printed on the first and second label panels according to one embodiment of the disclosure.

Referring to FIGS. 6-7, the third label panel may be used for other purposes for prescriptions in which the prescription information fits entirely within the first label panel 20. As explained above, where use of the third label panel 24 is desired, the third label panel 24 is not removed and the continuous label 14 including the third label panel is applied to a larger container such as the 30 dram container. As shown in FIG. 6, the third label panel 24 may be used to print an advertisement. The advertisement can be specifically directed to goods or services that are medically related to the pharmaceutical in the container 12. For example, advertisements directed at diabetic testing equipment can be affixed to the third label panel 24 on a pharmaceutical container 12 that carries a prescription of diabetic medicine. As such, the advertisements may be patient specific. The advertisements may also be tied to a specific location such as local businesses within a certain distance of the pharmacy or group of pharmacies where the pharmaceutical storage system was purchased. Specific items can also be advertised, such as specials for a particular business or the pharmacy where the pharmaceutical storage system was purchased. Additionally, coupons may be added to the advertisements.

Alternatively, advertisements preferably having similar dimensions as the third label panel 24 of label 14 are pre-printed by the pharmacy or third party. In these situations, the advertisement is not printed on the third label panel 24 even when the prescription information fits entirely within the first label panel 20. The pharmacist applies the label 14 containing only the first and second label panels 20 and 22 to a larger container 12 and then applies one of the pre-printed advertisements alongside label 14. This embodiment may be particularly useful in situations where the pharmacist would like the advertisement to be printed in color but the pharmacist's standard label printer does not have color printing capability.

As shown in FIG. 7, an alternate embodiment is shown where the third label panel 24 is used to print a bilingual label that includes the most pertinent information contained in the first and second label panels 20 and 22 in a language that is different from the language printed on the first and second label panels 20 and 22. Such an embodiment may be particularly useful for pharmacies located in heavy bilingual locations. Referring to the example of FIG. 7, the first label panel 20 and second label panel 22 are printed for the verapamil prescription substantially as described above. As the third label panel 24 is not needed in providing the prescription information and auxiliary information in English, the third label panel 24 is used to print in Spanish the instructions to the patient for taking the pharmaceutical, the purpose of the pharmaceutical, and the auxiliary information. In situations described below in which it is explained that an advertisement may be printed on a third label panel 24, it should be understood that a bilingual label containing prescription and warning information in a separate language than the language of the first and second label panels 20 and 22 may be printed on the third label panel 24 instead of the advertisement.

Figure 8:
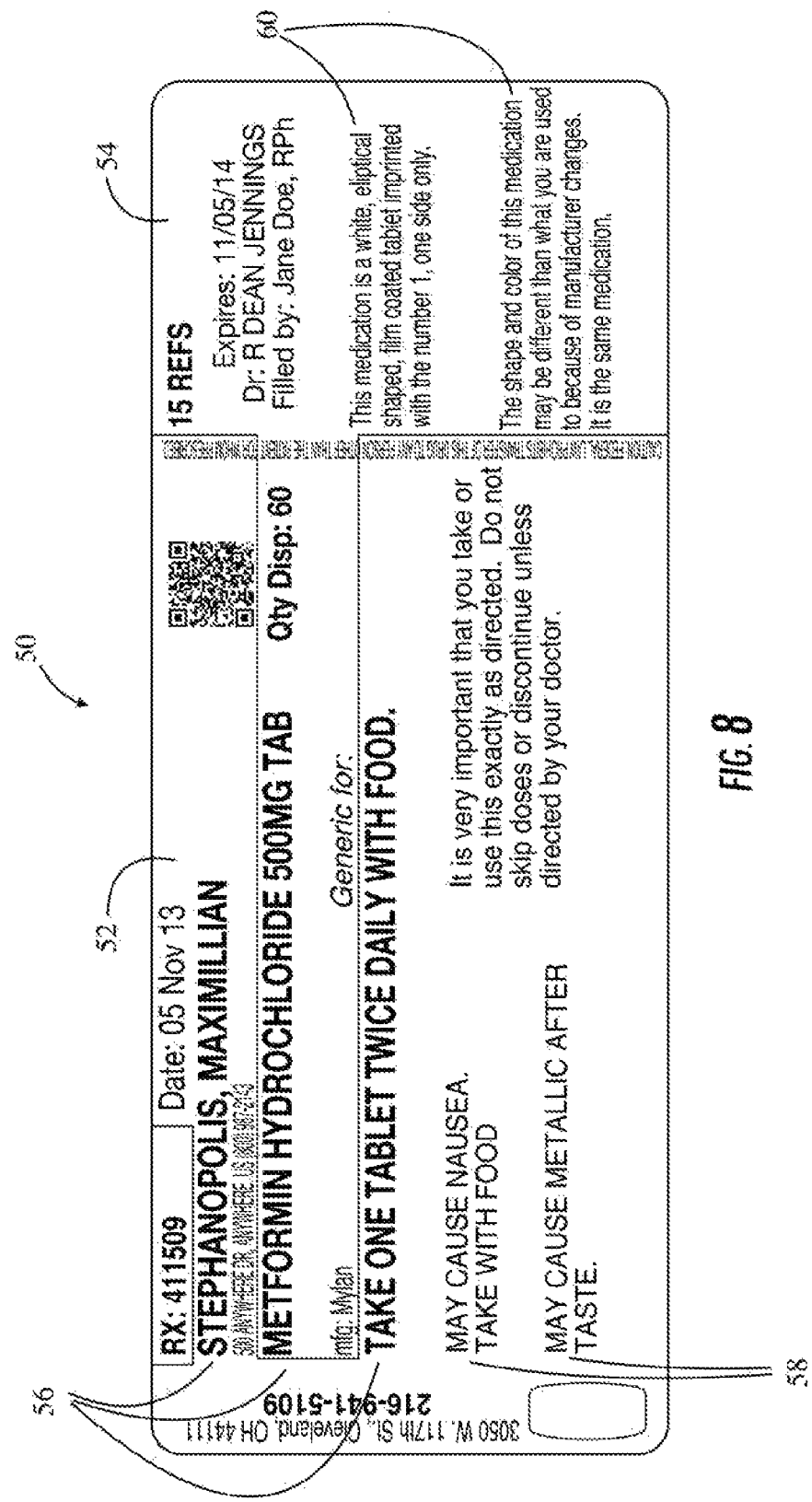
FIG. 8 depicts a printed label for an exemplary metformin hydrochloride prescription according to an alternate embodiment of the disclosure.
Figure 9:
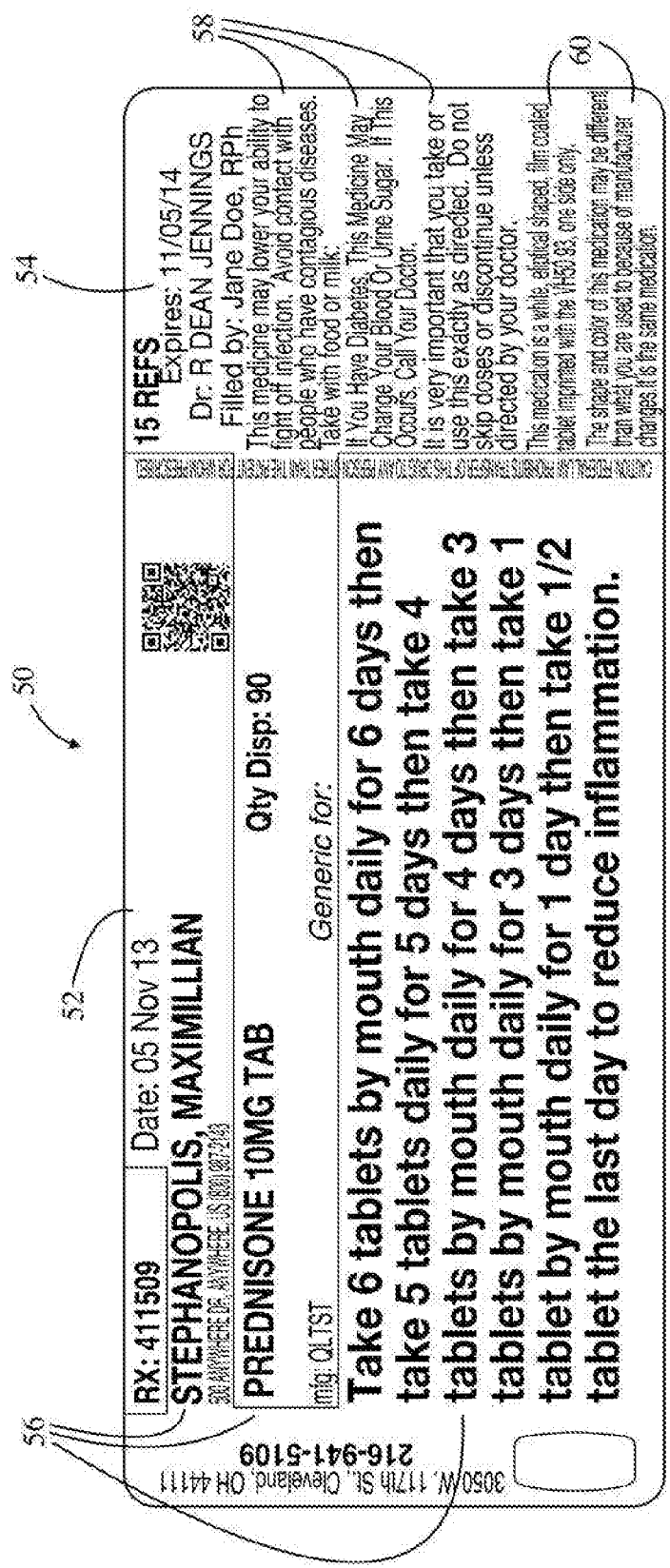
FIG. 9 depicts a printed label for an exemplary prednisone prescription according to an alternate embodiment of the disclosure.

Referring to FIGS. 8 and 9, according to an alternate embodiment of the disclosure, two rectangular labels 50 are shown as printed for two exemplary prescriptions—one prescription for metformin hydrochloride having brief dosing instructions (FIG. 8) and another prescription for prednisone having lengthy dosing instructions (FIG. 9). Similar to the labels 14 described above, each rectangular label 50 preferably includes a height ranging from about 2 inches to about 2.5 inches, most preferably about 2.125 inches for labels designed to be applied to a 13-dram container and about 2.5 inches for labels designed to be applied to a 16-dram container, and a length ranging from about 5.5 inches to about 6.75 inches. However, contrary to the label 14 described above having three separate label panels of similar dimensions, label 50 includes a first label section 52 and a second label section 54 with the first label section 52 including a greater length than the second label section 54. In preferred embodiments, the first label section 52 includes a length ranging from about 3.75 inches to about 6 inches, and most preferably about 4 to 4.5 inches.

While the information printed on the first label section 52 and second label section 54 will vary depending on the particular prescription being filled by the pharmacist, the first label section 52 is preferably dimensioned and configured to include all of the more critical patient directed prescription information 56 for virtually all possible prescriptions. In other words, because the first label section 52 of label 50 includes a length that is at least substantially similar to the combined length of the first label panel 20 and second label panel 22 described above with respect to label 14, the prescription information 56 should almost always fit on the first label section 52 preferably in at least a 12-point font. As described above, the prescription information 56 includes, at a minimum, the SIG information (i.e., (1) the name of the patient, (2) identification of the medicine, e.g., the name and strength of the medicine, and (3) instructions to the patient for taking the medicine), and often includes other information such as the name/address of the dispensing pharmacy and the "purpose" of the prescribed pharmaceutical.

Further, particularly for prescriptions having shorter dosing instructions, the first label section 52 will often include additional printing space even after the prescription information 56 is printed on the first label section 52 due to the larger printing area of the first label section 52 of label 50 as compared to the first label panel 20 of label 14. In these situations, as shown in FIG. 8, auxiliary warning information 58 is then printed on the first label section 52 with the prescription information 56. In preferred embodiments, the auxiliary warning information 58 is also printed in at least 12-point font directly below the dosing instructions of the prescription information 56. Then, as generally described above with respect to the third label panel 24 of label 14, the second label section 54 may then be removed when not needed so that label 50 may be applied to smaller containers or the third label section 54 may be used for other optional information 60 such as advertisements, bilingual instructions, refill information, description of the appearance of the dispensed medication, etc. when applied to larger containers.

On the other hand, in situations where the prescription information 56 takes up the majority of space of the first label section 52 such as shown for the prednisone prescription of FIG. 9, the auxiliary warning information 58 "overflows" to the second label section 54. In preferred embodiments, the warning information 58 is either printed entirely on the first label section 52, preferably in a font size substantially similar to the prescription information 56, or entirely on the second label section 54 in a smaller font if needed. In other words, the warning information 58 is preferably not split between the first label section 52 and second label section 54 even when the length of the prescription information 56 would allow part of the warning information 58 to fit on the first label section 52. Alternately, the warning information 58 can be split between the first label section 52 and second label section 54 when possible.

According to the embodiment of FIGS. 8 and 9, it is envisioned that the prescription information 56 and warning information 58 of a large majority of dispensed prescriptions will fit entirely on the first label section 52. Thus, for most prescriptions, both the prescription information 56 and warning information 58 are on the same label section in a prominent font with the warning information 58 directly below the prescription information 56. This arrangement is advantageous, in part, because users of prescription containers are more likely to ignore or fail to carefully discern warning information that is printed in smaller font on a different section of a label from the prescription information 56, particularly after already reading the label 50 the first couple of times the user takes the medication dispensed in the particular container. However, the present system provides the second label section 54 that is available to print the warning information 58 when needed.

Figure 10:
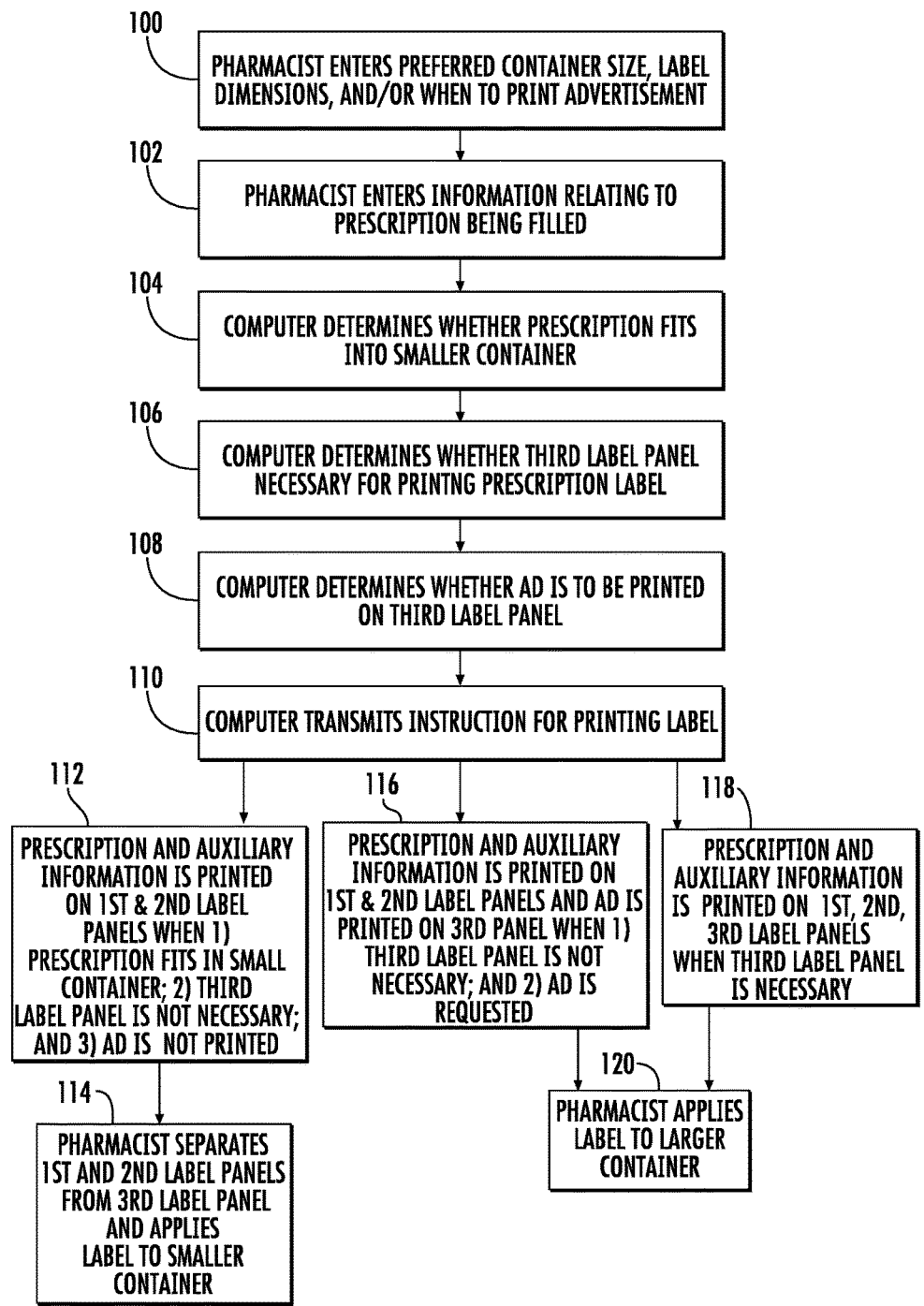
FIG. 10 depicts a flow chart of a method of printing a label for a pharmaceutical prescription according to one embodiment of the disclosure.

Referring to FIG. 10, a method of the present disclosure for printing and applying the labels to a pharmaceutical container 12 using a computer system is depicted. It should be understood that the following steps are not required to be performed in any particular order. While the method is depicted and described below with respect to label 14 having three label panels, it should be understood that a similar method could be used for label 50 where the first section 52 generally combines the first panel 20 and second panel 22 of label 14 and the second section 54 is similar to the third panel 24. For example, in step 106 described below, the computer system may be modified to use label 50 by determining whether the second label section 54 is necessary by determining whether the prescription information 56 and warning information 58 fits entirely on the first label section 52.

In step 100, information regarding a pharmacist's or other user's preferences is provided to the computer system such as the preferred container size, the dimensions of the rectangular label 14 to which the pharmaceutical prescription will be printed, and/or when an advertisement or other information should be printed on the third label panel 24 if possible. For example, the pharmacist may provide that the preferred container size is a 13 dram container. Based on this information, the computer system recognizes that it will not need to print an advertisement on the third label panel if the pharmaceutical prescription will fit in the 13 dram container 12 even when the third label panel is available to be printed on as a label containing all three panels will not fit on the 13 dram container.

By providing a preferred container size, the computer system may also be programmed to print the pharmaceutical prescriptions onto a label 14 having particular dimensions that correspond to the preferred container size, i.e., about 2.125 inches in height and a combined length of the first and second label panels of about 4 inches for a preferred container size of 13 drams. For a typical 16 dram container, the height of the label 14 may be increased to about 2.5 inches. Alternatively or in conjunction with the information regarding the container size, the pharmacist may provide the particular dimensions of the labels 14 loaded into the printer.

In step 102, the pharmacist enters certain information pertaining to the particular pharmaceutical prescription to be filled such as the particular pharmaceutical prescription and patient identification into a pharmacist computer. Certain information, such as purpose, instruction, and/or auxiliary information, is preferably predetermined based on the particular pharmaceutical identified by the pharmacist, or the pharmacist may individually enter/edit this information for printing on the labels.

In step 104, the computer system determines whether the particular pharmaceutical prescription entered in step 102 will fit into one of the smaller container sizes, i.e., a 13 or 16 dram container. In situations in which the particular pharmaceutical prescription does not fit into one of the smaller container sizes, a larger container will be required.

In step 106, the computer system determines whether the third label panel 24 is necessary by determining whether the prescription information fits entirely on the first label panel 20 of the label 14 loaded into the printer. In preferred embodiments, the computer system is programmed to know how many characters will fit on the first label panel 20 for each label size and formatting options such as font type and size. The computer system then calculates the character count required for the prescription information of a particular pharmaceutical prescription. If the size of the prescription information exceeds the size available for the chosen label, the computer system determines that the prescription information does not fit entirely on the first label panel 20 and divides the prescription information into two portions.

Similarly, the computer system may determine whether the third label panel 24 is necessary in step 106 by determining whether the prescription information and auxiliary warning information fit entirely on the first and second label panels 20 and 22. For example, in embodiments where the prescription information and warning information may be combined on label panels or where the warning information may over flow to the third label panel 24 as described in certain embodiments above, the computer system will need to determine whether the prescription information and auxiliary warning information fits entirely on the approximately 4 inch label 14 containing the first and second label panels 20 and 22. If the computer system determines that it is necessary to print the auxiliary label or at least some of the warning information on the third label panel 24, a larger container will be required.

In step 108, the computer system determines whether an advertisement or other information is to be printed on the third label panel 24 based on the preferences entered into the system in step 100. When it is determined in step 106 that it is necessary to print the auxiliary label or at least some information on the third label panel, the system recognizes that the third label panel 24 is not available for an advertisement. Similarly, when it is determined in step 104 that the pharmaceutical prescription will fit in the smaller sized container and the preferences indicate that the user would like to apply the label to the smaller sized container if possible, the system preferably recognizes that it does not need to print an advertisement on the third label panel 24 even if it has been determined in step 106 that it is not necessary to print warning information on the third label panel 24. In situations in which the user has indicated that an advertisement is not to be printed on the third label panel 24, such as the case when the pharmacist is using pre-printed color advertisements, step 108 may be unnecessary.

In step 110, the computer system transmits the information entered in step 102 to the label printer along with instructions for printing the information on the label 14. The instructions for printing the information will vary based on the determinations made by the computer system in steps 104, 106, and 108.

Referring to steps 112 and 114, in situations where it has been determined that the pharmaceutical prescription fits into a smaller container size, the third label panel 24 is not to be used to print an advertisement, and that it is not necessary to print at least some of the warning information on the third label panel, the label printer prints the prescription information and auxiliary information on the first and second label panels 20 and 22 of the first label section in step 112. In step 114, the pharmacist removes the first label section from the third label panel 24 of the second label section from the first label section and applies the label 14 containing the first label section to the suitable smaller container.

Referring to step 116, in situations where it has been determined that the prescription information does not fit entirely on the first label panel 20 or it is otherwise necessary to print at least some of the warning information on the third label panel 24, the label printer prints a portion of the prescription information on the first label panel 20, the remaining portion on the second label panel 22, and the auxiliary label on the third label panel 24. In step 120, the pharmacist applies the label 14 having first, second, and third panels 20, 22, and 24 to a suitable larger container.

Referring to step 118, in situations where it has been determined that it is not necessary to print at least some of the warning information on the third label panel but it has otherwise been determined that the pharmaceutical prescription does not fit into a smaller container size or the third label panel 24, if available, is to be used to print an advertisement, the label printer prints the prescription information and auxiliary information on the first and second label panels 20 and 22. The third label panel 24 is then left blank or printed with an advertisement depending on the determination of step 108.

In step 120, the pharmacist applies the label 14 having at least the first and second label panels 20 and 22 to a suitable larger container. If an advertisement is printed on the third label panel 24, the label containing all three labels will be applied to the larger container. If an advertisement is not printed on the third label panel 24, the first label section having the first and second label panels 20 and 22 is preferably removed from the third label panel 24 of the second label section prior to applying the first label section of label 14 to the larger container. A pre-printed advertisement may then be applied to the container.

According to an alternate embodiment of the method described above, the pharmacist or other user may choose to always print an advertisement on the third label panel 24 when the third label panel 24 is available. In this embodiment, before applying the label 14 to a container, the pharmacist chooses whether to remove the third label panel 24 from label 14 based on which sized container the pharmacist would like to use to fill the pharmaceutical prescription.

According to another embodiment of the disclosure, a roll of a plurality of the labels 14 may be provided. The roll is particularly suitable for use in an automated label printing system. In this embodiment, each panel is preferably operable to be removed from an adjacent panel. During printing of a prescription, the prescription information of a first prescription is printed on the first label panel 20, second label panel 22, and third label panel 24 substantially as described above. However, if the third panel 24 is not needed, such as with the verapamil prescription, and the pharmacist does not wish to print an advertisement on the third label panel 24, the first and second panels 20, 22 are removed from the roll, and label 14 containing the first and second label panels 20, 22 is applied to the prescription container.

Accordingly, what would have been an unwanted or wasted label, e.g., the third label panel 24, becomes the first label panel 20 of the next prescription to be printed. As will be appreciated, in the course of printing large numbers of prescription labels, the savings in both ink and label material achieved by avoiding the unwanted label 24 is significant. In embodiments in which the dispensing of pharmaceuticals is automated, providing a roll of a plurality of labels is preferred and the process of removing necessary panels from the roll is automated as well by the dispensing machine.

Figure 11:
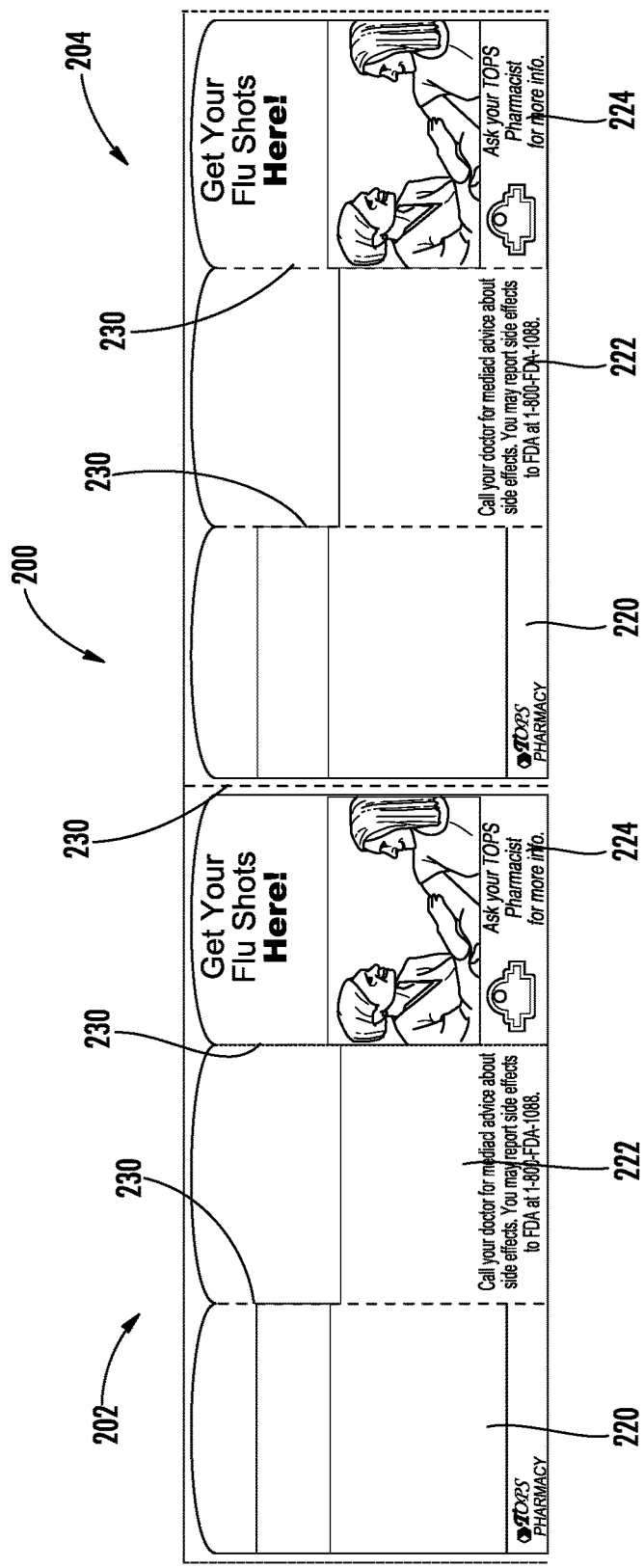
FIG. 11 depicts label roll where each of the third label panels of the labels includes non-prescription specific information pre-printed thereon by the label supplier according to one embodiment of the disclosure.
Figure 12:
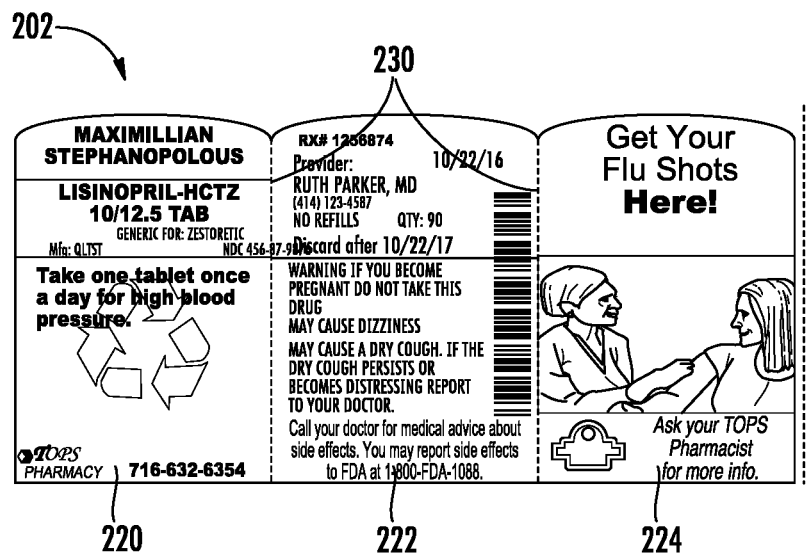
FIG. 12 depicts a printed label for an exemplary verapamil prescription where the third label panel includes a pre-printed advertisement according to one embodiment of the disclosure.
Figure 13:
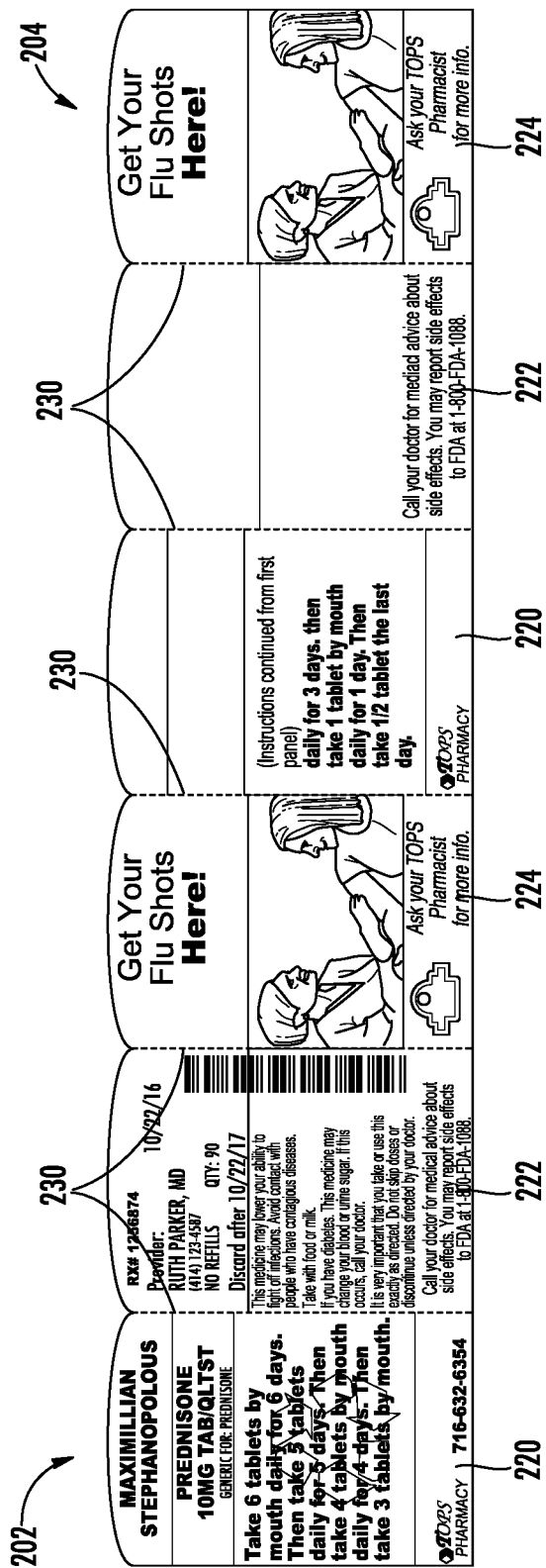
FIG. 13 depicts a printed label for an exemplary prednisone prescription where the first label panel of the second label on the label roll includes the overflow of prescription specific information according to one embodiment of the disclosure.

Referring to FIGS. 11-13, according to further embodiments of the disclosure, the overflow concept described above is applied to systems for providing a label for a prescription container having the optional information pre-printed off-site from the pharmacy by a label supplier. The systems optimize prescription container size by providing the pharmacy with the ability to efficiently print and apply a label to the prescription container with the pre-printed non-prescription specific information for most prescriptions with shorter prescription specific information or to print and apply a label without the pre-printed optional information for prescriptions with longer prescription specific information.

As shown in FIG. 11, a label roll 200 is provided with a plurality of rectangular labels 202, 204 each preferably configured and sized similarly to the rectangular label 14 as shown and described above with respect to FIGS. 4-7. In this regard, each label 202, 204 includes a first label panel 220, a second label panel 222, and a third label panel 224. Perforated lines 230 are provided between each of the panels to facilitate removal of a particular panel or panels from labels 202, 204. In contrast to label 14, each of the third label panels 224 includes desired optional information pre-printed by a label supplier (such as a pre-printed advertisement as noted above or a pharmacy Tillable graphical representation table for assisting a patient in dispensing the medication in a pill tray as disclosed in U.S. Patent Publication No. 2016/0331642, which is incorporated herein by reference). The optional information is able to be pre-printed by the label supplier because it includes non-prescription specific information. In other words, because the optional information is generic to the prescription being dispensed, the optional information is able to be pre-printed by the label supplier offsite from the pharmacy without knowing the prescription to which the label will ultimately be assigned. In preferred embodiments, the pharmacy selects the non-prescription specific information to be pre-printed on the third label panel and provides the selection to the label supplier. Pre-printing the optional information is highly desirable as it will save the pharmacy significant time and resources as well as allow for more complicated graphics than those able to be printed on typical pharmacy printing systems.

Referring to the exemplary verapamil prescription label of FIG. 12, the prescription specific information will fit on the first label panel 220 and second label panel 222 for most prescriptions. In these instances, the first label 202 is separated from the label roll and applied to a prescription container with the third label panel 224 having the non-prescription specific information pre-printed thereon. The first label panel 220 and second label panel 222 of the second label 204 are then used to print at least the beginning of the prescription specific information of the next prescription filled by the pharmacy.

However, as should be appreciated from the disclosure above, one of the difficulties in providing a prescription label with non-prescription specific information pre-printed on the third panel 224 is that the third panel 224 is needed for printing prescription specific information for certain prescriptions when attempting to optimize container/label size according to the present disclosure. In other words, for prescriptions such as the prednisone prescription shown in FIG. 5, the prescription specific information does not fit entirely on the first label panel 220 and second label panel 222 of label 202. Thus, referring to FIG. 13, any needed "overflow" information is printed onto the first label panel 220 of the second label 204. The first label panel 220 and second label panel 222 of the first label 202 are then applied to the appropriate container with the first label panel 220 of the second label 204. In preferred embodiments, the first label panel 220 and second label panel 222 of the first label 202 and the overflow first label panel 220 of the second label 204 are applied to a smaller container (e.g., 30 dram container having a circumference of about 6 inches) without the third label panel 224 of the first label 202. Alternately, when the pharmacy desires to always include the pre-printed label panel 224, the pharmacy may choose to apply all three panels of the first label 202 with the first label panel 220 of the second label 204 to a larger container. The second label panel 222 and third label panel 224 of the second label 204 are then preferably discarded and the next prescription begins printing on the first label panel 220 of the next label of the label roll.

According to embodiments where the first label 202 and second label 204 are provided on successive sheets in a printer instead of a label roll, the printer is similarly instructed to print the "overflow" prescription specific information on the first label panel 220 of the next sheet when it is determined that the prescription specific information does not fit entirely on the first label panel 220 and second label panel 222 of the first label 202.

According to other embodiments, labels 202, 204 are configured and sized similarly to the rectangular label 50 as shown in FIGS. 8-9 (i.e., the first label panel 220 and second label panel 222 are combined into a first label section for printing prescription specific information and the third label panel is a second label section containing the pre-printed optional information). According to this embodiment, the "overflow" prescription specific information is printed on the first label section of the second label 204 when it is determined that the prescription specific information does not fit entirely on the first label section. The first label section of the first label 202 is then applied to a prescription container with the first label section of the second label 204.

In yet another embodiment, two different labels are provided to a pharmacy. The first label is substantially as described above with a first distinct label section (which may be separated into distinct panels as shown in FIGS. 11-13) having a printable area configured to receive prescription specific information printed at the pharmacy and a second distinct label section including non-prescription specific information pre-printed off-site from the pharmacy by the label supplier. The second label is similarly configured to the first label except it includes a printable area that is larger than the printable area of the first label section of the first label. The second label also preferably omits the second label section containing the non-prescription specific information pre-printed off-site from the pharmacy by the label supplier such that both the first label and the second label have a similar length/width that conforms to a container with a smaller circumference.

According to this embodiment, a plurality of first labels are loaded into a first printing source and a plurality of second labels are loaded into a second printing source. The first printing source and second printing source may be different printers or distinct trays of the same printer. When the pharmacy computer system determines that the prescription specific information fits entirely in the printable area of the first label, the first printing source is selected, the prescription specific information is printed in the printable area of a first label, and the first label with the pre-printed second label section is applied to a prescription container. On the other hand, when the pharmacy computer system determines that the prescription specific information does not fit entirely in the printable area of the first label, the second printing source is selected, the prescription specific information is printed in the printable area of a second label, and the second label is applied to the container.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method of producing a prescription label for a prescription pharmaceutical storage container for holding and dispensing a pharmaceutical for a patient, the method including the steps of:
   receiving at a pharmacy a label system having at least a first label and a second label, each of the first and second labels having a first distinct label section and a second distinct label section, the first distinct label section being configured to receive prescription specific information printed at the pharmacy and the second distinct label section including non-prescription specific information pre-printed off-site from the pharmacy by a label supplier;
   determining at the pharmacy whether a length of prescription specific information for the pharmaceutical being dispensed fits entirely on the first distinct label section of the first label;
   upon determining that the length of the prescription specific information fits entirely on the first distinct label section of the first label, printing the prescription specific information on the first distinct label section of the first label and applying the first distinct label section and second distinct label section of the first label to the prescription pharmaceutical storage container; and
   upon determining that the length of the prescription specific information does not fit entirely on the first distinct label section of the first label, printing a first portion of the prescription specific information on the first distinct label section of the first label, printing a continuation of the prescription specific information on the first distinct label section of the second label, and applying the first distinct label section of the first label and the first distinct label section of the second label to the prescription pharmaceutical storage container.

2. The method of claim 1 wherein the label system further includes a third label having a first distinct label section and a second distinct label section, the first distinct label section of the third label being configured to receive prescription specific information printed at the pharmacy and the second distinct label section of the third label including non-prescription specific information pre-printed off-site from the pharmacy by a label supplier, the method further comprising:

when the prescription specific information is printed entirely on the first distinct label section of the first label, producing a second prescription label for a second pharmaceutical by beginning printing of prescription specific information for the second pharmaceutical on the second label; and when the continuation of the prescription specific information is printed on the first distinct label section of the second label, producing the second prescription label for the second pharmaceutical by beginning printing of prescription specific information for the second pharmaceutical on the first distinct label section of the third label.

3. The method of claim 1 wherein the first and second distinct label sections of the first label are removably connected and the first and second distinct label sections of the second label are removably connected, the method further comprising:

when the prescription specific information is printed entirely on the first distinct label section of the first label, applying the first distinct label section and second distinct label section of the first label to the prescription pharmaceutical storage container while connected; and prior to applying the first distinct label section of the first label and the first distinct label section of the second label to the prescription pharmaceutical storage container when the continuation of the prescription specific information is printed on the first distinct label section of the second label, separating the first distinct section of the first label from the second distinct section of the first label and separating the first distinct section of the second label from the second distinct section of the second label.

4. The method of claim 3 wherein the first label is secured to a first distinct substrate and the second label is secured to a second distinct substrate, the method further comprising loading the first distinct substrate and the second distinct substrate as successive pages in a printer.

5. The method of claim 3 wherein the first label and second label are provided as successive labels on a label roll.

6. The method of claim 1 wherein the prescription specific information includes at least a name of the patient, identification of the pharmaceutical dispensed in the prescription pharmaceutical storage system, and dosing instructions to the patient for taking the dispensed pharmaceutical being printed in at least 12-point font.

7. The method of claim 6 wherein the prescription specific information further includes warning information.

8. The method of claim 1 wherein the non-prescription specific information includes an advertisement.

9. The method of claim 1 further comprising the pharmacy selecting the non-prescription specific information to be pre-printed off-site from the pharmacy on the second distinct label section and the pharmacy providing the selection to the label supplier.

10. The method of claim 1 wherein the first distinct label section of the first and second labels each includes a first label panel removably connected to a second label panel and the second distinct label section of the first and second labels includes a third label panel removably connected to the second label panel, the continuation of the prescription specific information being printed on the first label panel of the first label section of the second label.

11. The method of claim 10 wherein each of the first, second, and third label panels include a length of about 2 inches to about 2.125 inches.

12. The method of claim 1, wherein the steps of determining whether the length of prescription specific information fits entirely on the first distinct label section of the first label and printing the prescription specific information on the first distinct label section of the first label or the first distinct section of the first and second labels comprise automated steps performed by a computer controller.

* * * * *